United States Patent [19]

Price et al.

[11] Patent Number: 4,709,815

[45] Date of Patent: Dec. 1, 1987

[54] TAPE CARTRIDGE HOLDING CASE

[75] Inventors: Macy J. Price; Macy J. Price, Jr., both of Golden; Mack E. Johnson, Littleton, all of Colo.

[73] Assignee: Engineered Data Products, Inc., Broomfield, Colo.

[21] Appl. No.: 899,731

[22] Filed: Aug. 25, 1986

[51] Int. Cl.$^4$ .............................................. A47B 81/00
[52] U.S. Cl. ...................................... 206/387; 206/45; 211/40; 211/133; 220/22; 294/161; 312/35; 312/289
[58] Field of Search ................. 206/387, 444, 45, 216; 211/40-43, 128, 133, 134; 312/8-15, 289, 128, 132, 35, 287; 220/21, 22; 294/149, 159, 161-164

[56] References Cited

U.S. PATENT DOCUMENTS

| 3,170,741 | 2/1965 | Richards, Jr. | 312/12 |
| 3,556,620 | 1/1971 | Gutierrez | 312/13 X |
| 3,710,900 | 1/1973 | Fink . | |
| 3,861,556 | 1/1975 | Barecki et al. | 206/216 |
| 3,889,817 | 6/1975 | Berkman | 206/387 X |
| 3,907,116 | 9/1975 | Wolf et al. | 211/40 |
| 3,938,871 | 2/1976 | Bartholemew | 312/240 |
| 4,223,787 | 9/1980 | Lowry et al. | 206/387 |
| 4,293,075 | 10/1981 | Veralrud | 211/40 |
| 4,577,914 | 3/1986 | Stravitz | 312/10 |

FOREIGN PATENT DOCUMENTS 0063068 4/1984 Japan ................................. 206/387

OTHER PUBLICATIONS

IBM Literature, (admitted by applicant to be prior art).

Primary Examiner—George E. Lowrance
Assistant Examiner—Bryon Gehman
Attorney, Agent, or Firm—Klaas & Law

[57] ABSTRACT

An integrally molded plastic tape cartridge holding case having two oppositely facing openings provided with a plurality of inclined shelf means for supporting a tape cartridge placed thereon and an integrally molded tape cartridge transport case having compartments for holding a plurality of tape cartridge holding cases and a handle on the tape cartridge transport case so that the tape cartridge transport case can be transported from one location to another location.

6 Claims, 10 Drawing Figures

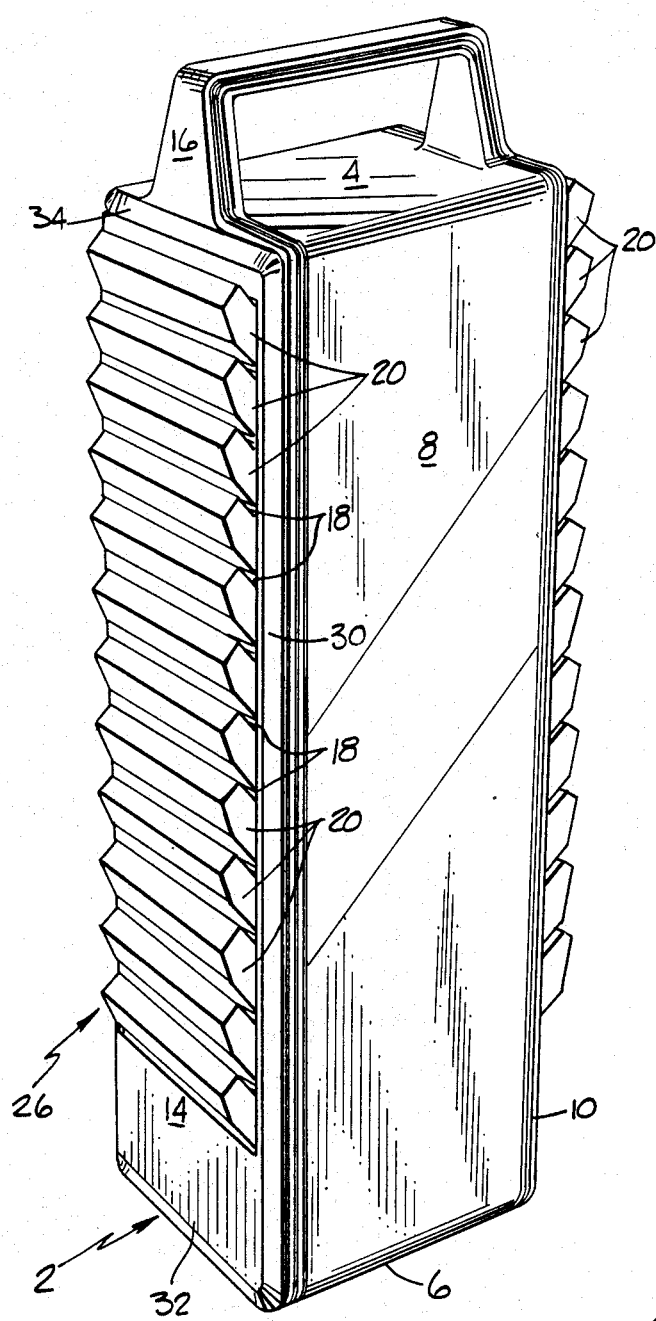
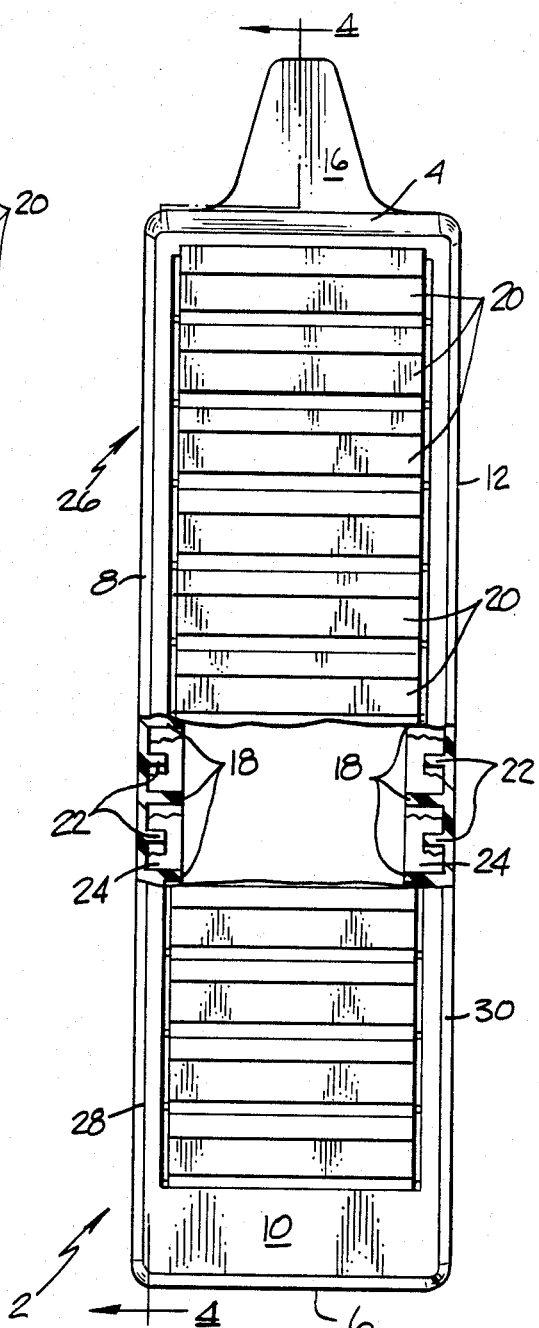

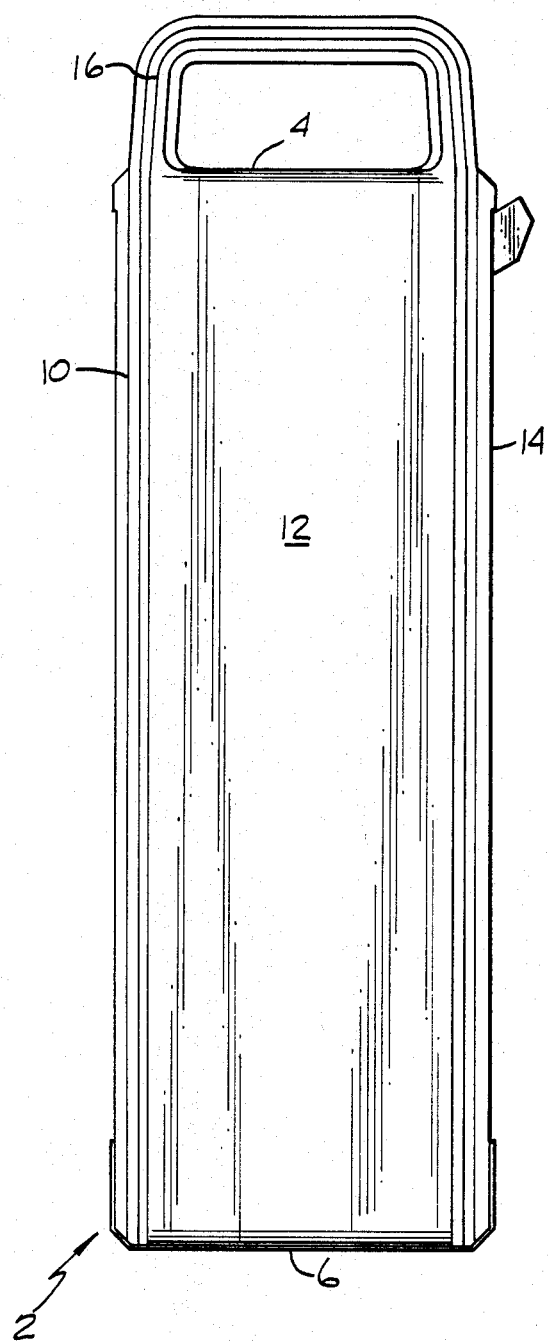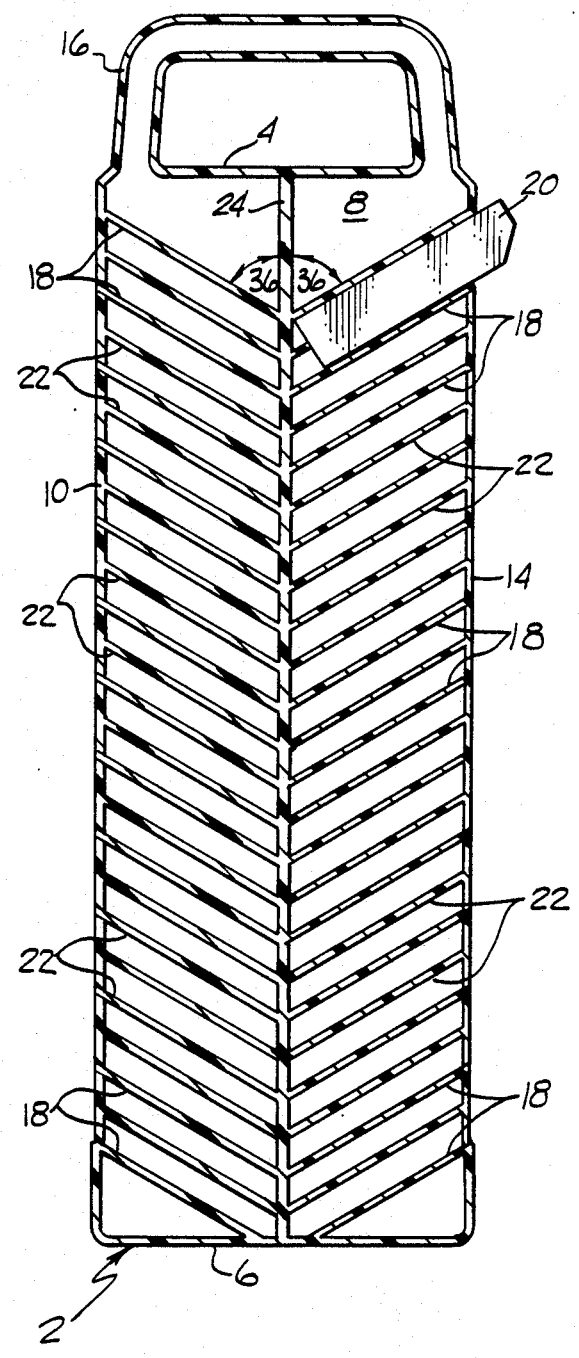

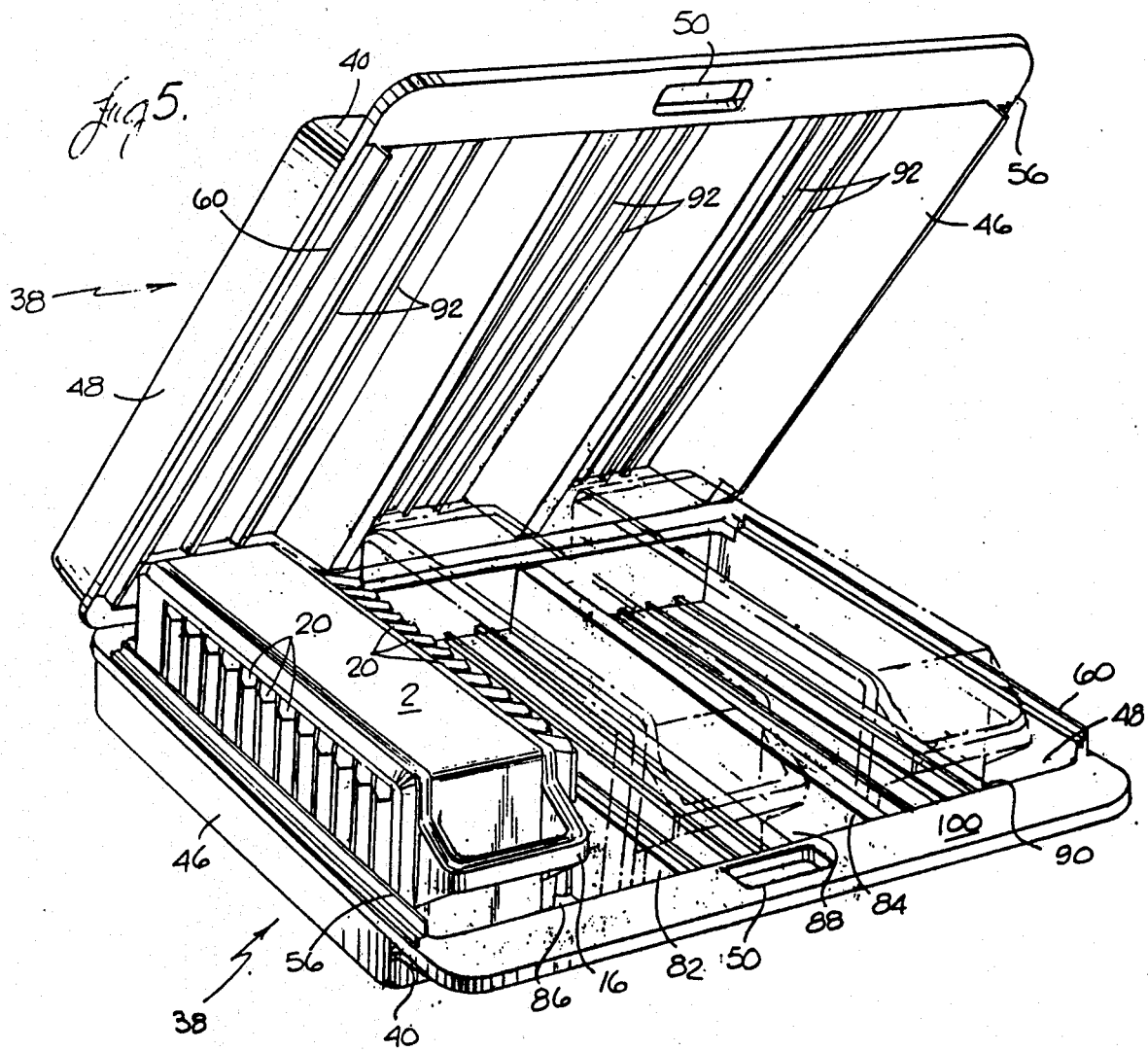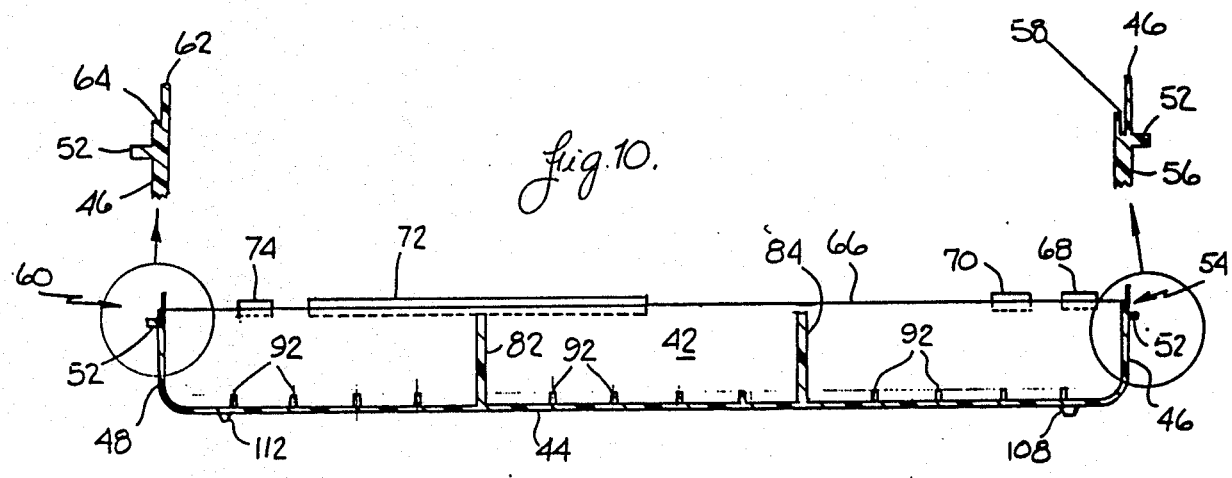

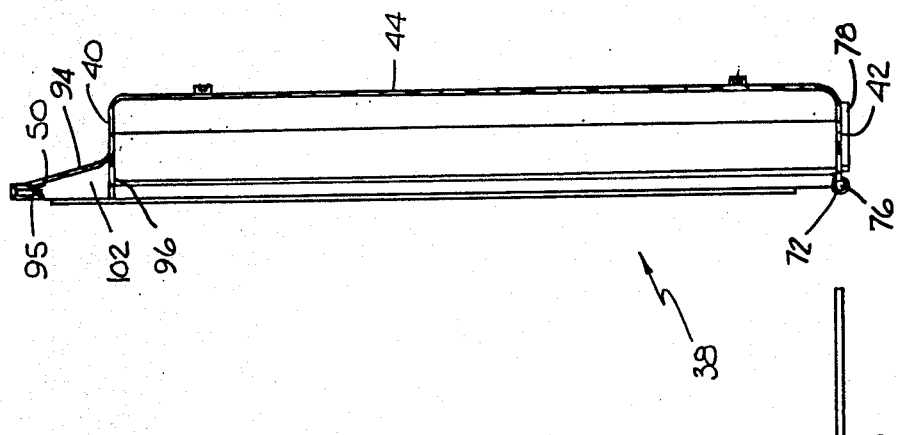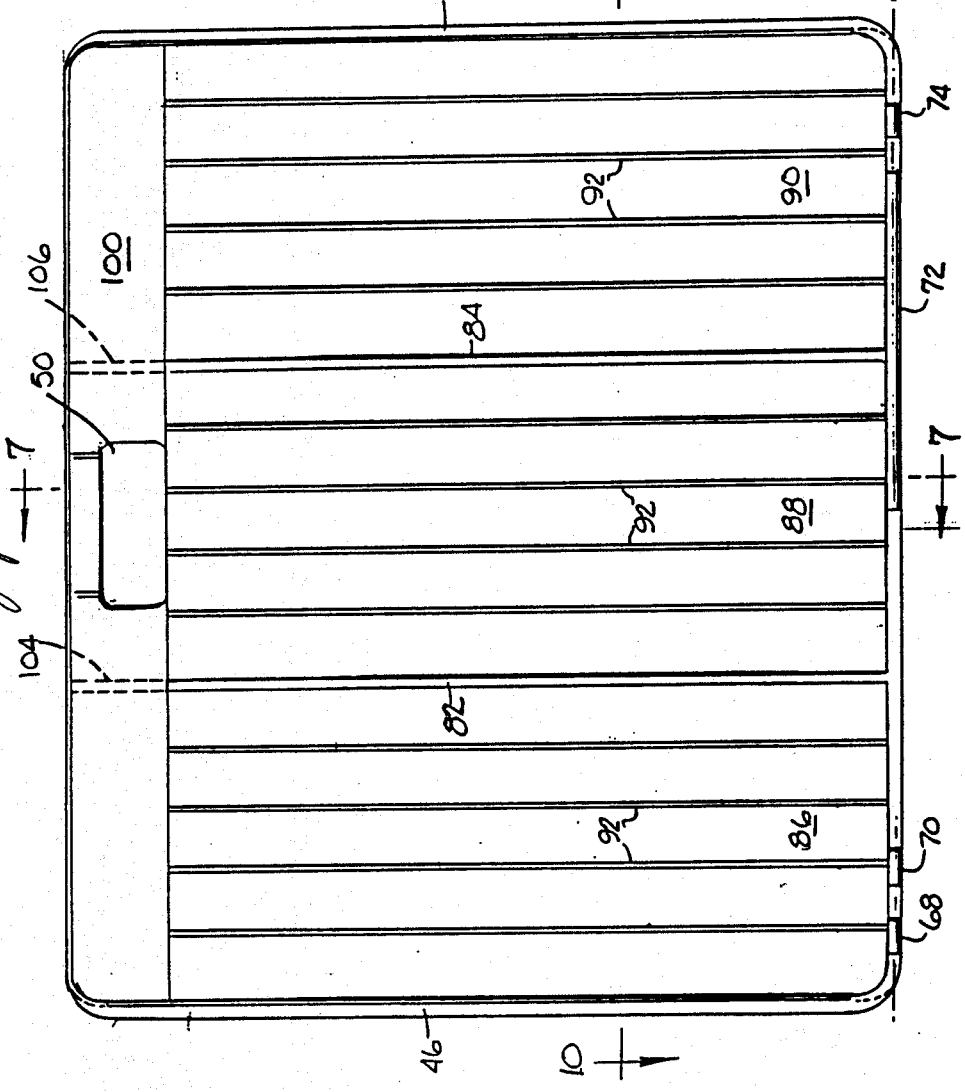

TAPE CARTRIDGE HOLDING CASE

FIELD OF THE INVENTION

This invention relates generally to the movement of tape cartridges into and out of a tape cartridge storage system and the transportation of tape cartridges from one location to another location and more specifically to a tape cartridge handling system having a tape cartridge holding case so that a plurality of tape cartridges may be removed from a tape cartridge storage system and positioned on shelf means in the tape cartridge holding case and a tape cartridge transport case for holding a plurality of tape cartridge holding cases for convenient transportation of the tape cartridges from one location to another location.

BACKGROUND OF THE INVENTION

The use of computers in today's business operations requires the movement of tape cartridges into and out of a tape cartridge storage system and the transporting of tape cartridges from one location to another location which may be off-site. One system for transporting tape cartridges is a movable truck having shelf means for holding tape cartridge holders. Each tape cartridge holder generally comprises a housing having one open side and a plurality of partitions formed therein for receiving tape cartridges. In use, the tape cartridge holder is supported on a surface with the open side facing upwardly and is then loaded with cartridges and when filled, placed into a compartment on the truck. Side flanges on the tape cartridge holder serve as handles but these cannot be conveniently transported for any considerable distance. Many times the number of tape cartridges to be moved into or out of the tape cartridge storage system is substantially less than the capacity of a truck. Also, a truck has to be maneuvered in tight surroundings.

BRIEF DESCRIPTION OF THE INVENTION

This invention relates to a tape cartridge holding case that can be conveniently used to move tape cartridges into or out of a tape cartridge storage system such as that illustrated in U.S. Pat. No. 4,600,107, which is incorporated herein by reference, and to a tape cartridge transport case having a plurality of compartments each of which is sized to hold a tape cartridge holding case filled with tape cartridges so that the tape cartridges may be transported to an off-site location for storage or use.

In one embodiment of the invention, the tape cartridge holding case comprises an elongated member integrally molded using a high density plastic material. The elongated member has a top wall portion, a bottom wall portion and four side wall portions and has a generally rectangular transverse cross-sectional configuration. A plurality of spaced apart ledges extend inwardly from a first side wall portion and from a facing second side wall portion. Oppositely facing openings are formed in a third side wall portion and in a fourth side wall portion. The ledges are positioned so as to form a plurality of shelf means associated with the oppositely facing openings so that a tape cartridge may be inserted through an opening and be supported on a cooperating pair of the ledges. A handle is secured to the top wall portion for convenience in carrying the elongated member. The ledges are inclined so that there is no tendency for the tape cartridges to move from the ledges during their transportation from one location to another location.

The tape cartridge transport case comprises two identical members joined together wherein each of the members is integrally molded from a high density plastic material and has a top wall portion, a bottom wall portion, a side wall portion, a first end wall portion, a second end wall portion and a handle opening in the top wall portion. Each of the members has a plurality of compartments each of which has an inner surface configuration to accommodate about one-half of the configuration of a tape cartridge holding case, described above, filled with tape cartridges. After a plurality of tape cartridge holding cases have been placed in the compartments of the tape cartridge transport case, the handle opening may be used to conveniently transport the tape cartridges to an off-site location for storage or use.

It is an object of this invention to provide a tape cartridge holding case that can be conveniently used to remove or replace a plurality of tape cartridges into or out of a tape cartridge storage system.

It is another object of this invention to provide a tape cartridge transport case for holding a plurality of tape cartridge holding cases and so that the tape cartridges are readily transportable to an off-site location.

Additional objects, advantages, and novel features of the invention are set forth in part in the description which follows which will be understood by those skilled in the art upon examination of the following or may be learned by practice of the invention. The objects and advantages of the invention may be realized and obtained by means of the instrumentalities and combinations particularly pointed out in the appended claims.

BRIEF DESCRIPTION OF THE DRAWING

FIG. 1 is a pictorial view illustrating a tape cartridge holding case of this invention;

FIG. 2 is an elevational view with parts in section of one side of the tape cartridge holding case;

FIG. 3 is an elevational view of another side of the tape cartridge holding case;

FIG. 4 is a cross-sectional view taken on the line 4—4 of FIG. 2 with one tape cartridge supported therein.

FIG. 5 is a pictorial view of a tape cartridge transport case of this invention comprising two identical members;

FIG. 6 is a side elevational view of the interior one of the members of FIG. 5;

FIG. 7 is a cross-sectional view taken on line 7—7 of FIG. 6;

FIG. 10 is a cross-sectional view taken on the line 10—10 of FIG. 6.

DETAILED DESCRIPTION OF THE INVENTION

Figure 9:
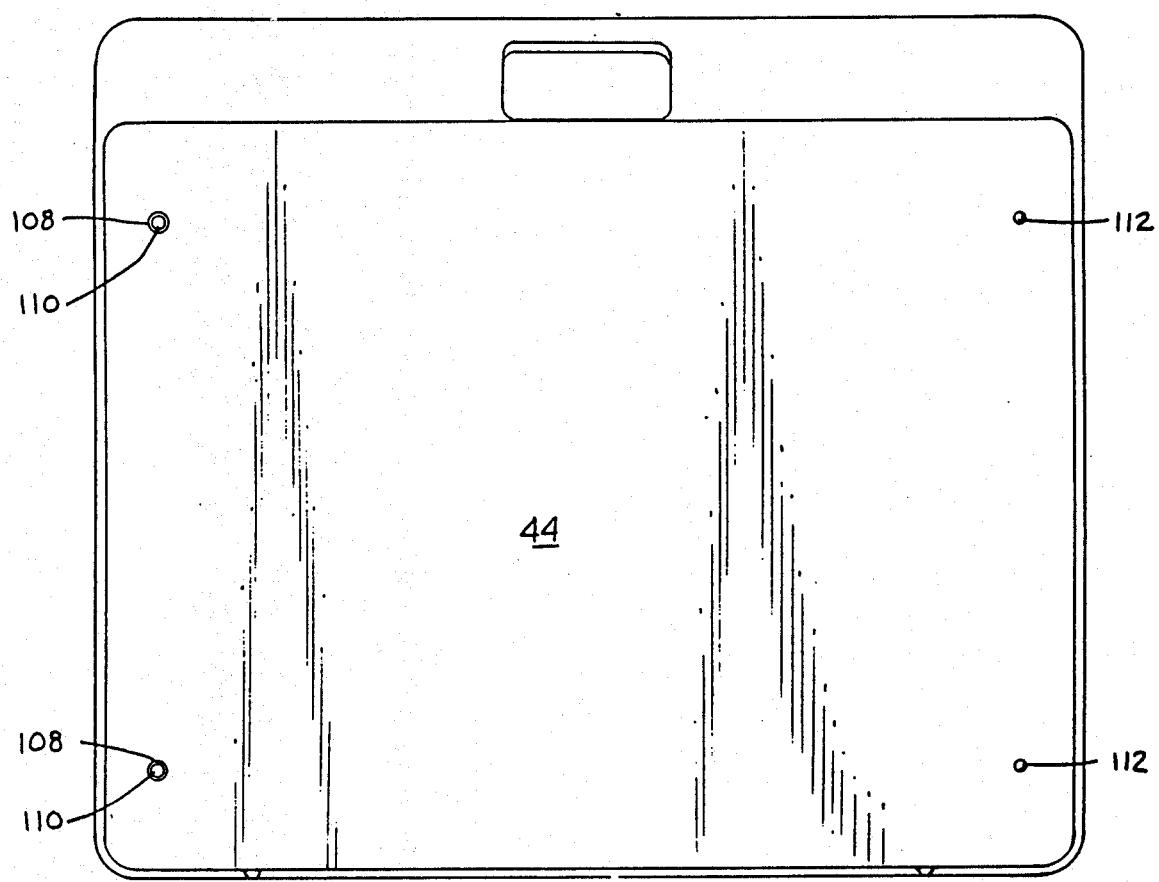
FIG. 9 is a bottom plan view of FIG. 6.
Figure 8:
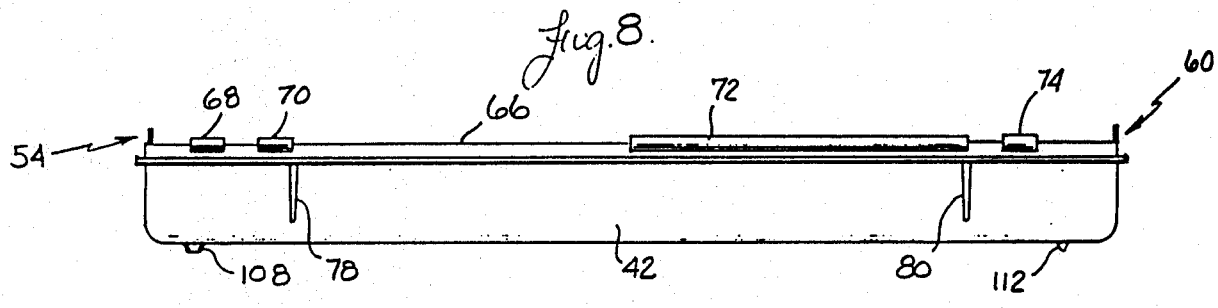
FIG. 8 is a side elevational view of the exterior of FIG. 6.

In FIGS. 1–4, there is illustrated a tape cartridge holding case comprising an elongated member 2 having a top wall portion 4, a bottom wall portion 6 and four side wall portions 8, 10, 12 and 14. A handle 16 is integral with the top wall portion 4. The elongated member 2 is preferably integrally molded using a plastic material such as high density polyethylene.

Extending inwardly from the side wall portions 8 and 12 are a plurality of spaced apart ledges 18. The ledges 18 on the side wall portions 8 and 12 cooperate to form a plurality of shelf means for supporting tape cartridges 20. The ledges 18 illustrated in FIGS. 2 and 4 only extend inwardly for a short distance. If desired, the shelf means could comprise a member extending completely between the side wall portions 8 and 12. A plurality of guide ribs 22 extend inwardly from side wall portions 8 and 12 and are located between the ledges 18. The guide ribs 22 extend inwardly for a distance less than the inward extent of the ledges 18. The guide ribs 22 are adapted to limit the sidewise movement of the tape cartridges 20 when positioned on the ledges 18.

A central rib 24 extends inwardly from the side wall portions 8 and 12 for a distance substantially the same as the ledges 18. The central rib strengthens the elongated member 2 and functions as a stop to limit the inward movement of the tape cartridges 20 on the ledges 18. If desired, the central rib 24 could extend completely between the side wall portions 8 and 12. As illustrated in FIG. 4, the central rib 24 is integral with the ledges 18 and the guide ribs 22.

The side wall portions 10 and 14 have a central opening 26 defined by side strips 28 and 30, a bottom panel 32 and a top panel 34. Tape cartridges 22 are inserted through the central opening 26 and supported on the ledges 18.

As illustrated in FIG. 4, the ledges 18 and the guide ribs 22 form an acute angle 36 with the central rib 24. This angle is between about 55 and 65 degrees and preferably is about 60 degree. This construction ensures that when the elongated member 2 is being carried by the handle 16, the tape cartridges 20 supported on the ledges 18 will be at an angle of about 30 degrees to the horizontal. Therefore, the force of gravity will always tend to hold the tape cartridges within the elongated member 2 when the tape cartridges are being transported from one location to another location. The elongated member 2, illustrated in FIGS. 1–4, is designed to hold twenty-four tape cartridges. However, it is understood that this is for illustration purposes only and that the elongated member 2 can be designed to hold other numbers of tape cartridges.

A tape cartridge transport case is illustrated in FIGS. 5–7 and comprises two members 38 which are identical so that each member 38 may be integrally molded using the same mold. In the preferred embodiment, a high density ABS material is used to form the member 38. Each member 38 has a top wall portion 40, a bottom wall portion 42, a side wall portion 44, a first end wall portion 46, a second end wall portion 48 and a handle opening 50 is formed in the top wall portion 40. A continuous rib 52 projects outwardly from and is integral with the first end wall portion 46, the bottom wall portion 42 and the second end wall portion 48 and functions to strengthen these wall portions. The top edge 54 of the first end wall portion 46 has an elongated linear projection 56 extending for substantially its entire length and a corresponding elongated linear recess 58. The top edge 60 of the second end wall portion 48 has an elongated linear projection 62 extending for substantially its entire length and a corresponding elongated recess 64. When the tape cartridge transport case is formed by superposing two members 38 together, the projection 56 is located in the recess 64 and the projection 62 is located in the recess 58 so that the top edges 54 and 60 and the top edge 66 of the bottom wall 42 effectively lie in a common plane.

A plurality of hollow hinge portions 68, 70, 72 and 74 extend outwardly from and are integral with bottom wall 42 and are located so as to be intermeshed when two members 38 are superposed. The hinge portions 68, 70, 72 and 74 have cylindrical inner surfaces, one of which 76 is illustrated in FIG. 7. A hinge pin 78 having a cylindrical outer surface is passed through the intermeshed hinge portions 68, 70, 72 and 74 when two members 38 are superposed. The bottom wall 42 is also provided with spaced apart integral feet 78 and 80 which also serve as strengthening ribs.

Partition panels 82 and 84 project inwardly from and are integral with side wall portion 44. The partition panels 82 and 84 cooperate with first and second end wall portions 46 and 48 to form three compartments 86, 88 and 90. Each of the compartments 86, 88 and 90 has an inner surface configuration equal to about one-half of the outer surface configuration of a tape cartridge holding case 2 with tape cartridges 20 inserted therein. A plurality of strengthening ribs 92 project inwardly from and are integral with side wall portion 44. As illustrated in FIG. 10, the partition panels 82 and 84 are slightly below the edge 66 and the strengthening ribs 92 only project inwardly for a relatively small distance. Although three compartments 86, 88 and 90 are illustrated, it is understood that the number of compartments may vary as desired.

The top wall portion 40, as viewed in FIG. 7, has an inclined portion 94, a horizontal portion 96 and a vertical portion 98 having a flat outer surface 100. End panels 102 extend between and are integral with the inclined portion 94 and the vertical portion 98. A portion 104 of partition panel 82 and a portion 106 of partition panel 84 are located between and integral with portions of the inclined portion 94 and the vertical portion 98.

A pair of spaced apart bosses 108, each having an open ended bore means 110 therein project outwardly from and are integral with the side wall portion 44. A pair of spaced apart pins 112 project outwardly from and are integral with the side wall portion 44. The bore means 110 and the pins 112 have corresponding cross-sectional configurations so that the pins 112 may be inserted into the bore means 110 to prevent relative movement between adjacent pairs of stacked storage cases.

In FIG. 5, there is a pictorial view of two members 38 in a partially opened superposed relationship joined by the hinge pin 78 passing through the hinge portions 68, 70, 72 and 74. A tape cartridge holding case 2 is located in each of the compartments 86, 88 and 90. The first end wall portion 46, the partition panels 82 and 84 and the second end wall portion 48 cooperate to ensure that the tape cartridges 20 remain in position in the tape cartridge holding case 2. When the members 38 are in a closed position, the projection 56 is in the recess 64, the projection 60 is in the recess 58 and the surfaces 100 are in abutting relationship. Relative sideways movement between the superposed members is prevented by the projections 56 and 60 in the recesses 58 and 64 and the hinge pin 78 in the hinge portions 68, 70, 72 and 74.

In operation, a person would take a tape cartridge holding case into a tape cartridge storage system and remove the desired number of tape cartridges and place them in the tape cartridge holding case. The person would then place the tape cartridge holding case having the tape cartridges therein into one of the compartments of the tape cartridge transport case. This operation would be repeated for the number of compartments in the tape cartridge transport case. When the desired number of tape cartridge holding cases have been placed into the tape cartridge transport case, it is closed and conveniently moved to another location by using the handle opening.

It is contemplated that the inventive concepts herein described may be variously otherwise embodied and it is intended that the appended claims be construed to include alternative embodiments of the invention except insofar as limited by the prior art.

What is claimed is:

1. A tape cartridge holding case for use in moving tape cartridges into and out of a storage system and for transporting tape cartridges from one location to another location comprising:
   an elongated member having a generally rectangular transverse cross-sectional configuration;
   said elongated member having at least a top wall portion, a bottom wall portion and four side wall portions all of which are integral;
   a first side wall portion having an inner surface;
   a second side wall portion having an inner surface facing said inner surface of said first side wall portion;
   a plurality of spaced apart ledges extending inwardly from said inner surfaces of said first side wall portion and said second side wall portion for a fixed distance and terminating in an edge;
   a third side wall portion extending between said first and second side wall portions;
   a fourth side wall portion extending between said first and second side wall portions;
   means defining only one opening in said third side wall portion facing in one direction and means defining only one opening in said fourth side wall portion facing in a direction opposite to said one direction;
   said ledges cooperating with said openings to form a plurality of shelf means so that tape cartridges may be inserted through each of said openings and be supported by opposite ledges of said first and second side wall portions;
   stop means comprising central rib means integral with said first and second side wall portions, said top wall portion and said bottom wall portion and extending inwardly therefrom;
   each of said ledges extending between said central rib means and said means defining said opening in said third and fourth side wall portions to form back to back compartments; and
   each of said ledges forming an acute angle with said central rib means with said acute angle facing said top wall portion.

2. A tape cartridge holding case as in claim 1 wherein: said acute angle is between about 55 and 65 degrees.

3. A tape cartridge holding case as in claim 1 and further comprising:
   a plurality of spaced apart guide ribs extending inwardly from said inner surface of said first side wall portion and from said inner surface of said second side wall portion for a fixed distance and terminating in an edge;
   said fixed distance of said guide ribs being less than said fixed distance of said ledges; and
   each of said guide ribs being located between adjacent ledges to ensure the proper positioning of tape cartridges supported on said ledges.

4. A tape cartridge holding case as in claim 3 and further comprising:
   a handle secured to said top wall portion for use in carrying said tape cartridge holding case.

5. A tape cartridge holding case as in claim 4 wherein: said elongated member is integrally molded using a high density plastic material.

6. A tape cartridge holding case as in claim 5 wherein: said acute angle is about 60 degrees.

* * * * *